(12) United States Patent
Mo et al.

(10) Patent No.: US 11,333,795 B2
(45) Date of Patent: May 17, 2022

(54) METHOD FOR TYPHOON CENTER AUTOMATIC SELECTION USING VECTORS CALCULATED FROM RADAR IMAGE DATA BY OPTICAL FLOW TECHNIQUE, RECORDING MEDIUM AND DEVICE FOR PERFORMING THE METHOD

(71) Applicant: KOREA METEOROLOGICAL ADMINISTRATION, Seoul (KR)

(72) Inventors: Sun Jin Mo, Gwangju (KR); Ji-Young Gu, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 0 days.

(21) Appl. No.: 17/355,921

(22) Filed: Jun. 23, 2021

(65) Prior Publication Data
US 2022/0075093 A1 Mar. 10, 2022

(30) Foreign Application Priority Data
Sep. 9, 2020 (KR) .................. 10-2020-0115182

(51) Int. Cl.
*G06T 7/215* (2017.01)
*G01W 1/10* (2006.01)
*G06K 9/62* (2022.01)

(52) U.S. Cl.
CPC ............. *G01W 1/10* (2013.01); *G06K 9/6273* (2013.01); *G06T 7/215* (2017.01); *G06T 2207/10044* (2013.01)

(58) Field of Classification Search
CPC .......... G01S 13/89; G01S 13/95; G01W 1/10; G06T 2207/10044; G06T 3/4007; Y02A 90/10
See application file for complete search history.

(56) References Cited

U.S. PATENT DOCUMENTS

| 2009/0224965 A1* | 9/2009 | Venkatachalam ......... G01S 7/12 342/26 R |
| 2011/0149268 A1* | 6/2011 | Marchant ................ G01S 17/58 356/27 |
| 2016/0104059 A1* | 4/2016 | Wang ................. G06K 9/00335 382/103 |

FOREIGN PATENT DOCUMENTS

| CN | 112379345 A | * | 2/2021 |
| JP | 2000/098055 A | | 4/2000 |

(Continued)

OTHER PUBLICATIONS

Jung, Jun Beom et al, "Estimation of Typhoon Center Using Satellite SAR Imagery" J. Korean Earth Sci. Soc., v. 40, No. 5, p. 502-517, Oct. 2019.

*Primary Examiner* — Ian L Lemieux
(74) *Attorney, Agent, or Firm* — Novick, Kim & Lee, PLLC; Sang Ho Lee; Hyun Woo Shin

(57) ABSTRACT

A method for automatic selection of typhoon center using vectors calculated from radar image data by an optical flow technique includes calculating a valid vector field from the radar image data using the optical flow technique, generating a dense vector field by interpolating an empty spot of the valid vector field using linear interpolation, extracting a rotating component anomaly vector field including typhoon rotating component anomaly vectors by removing a relative vector in the interpolated valid vector field, generating a normal vector intersection point of the vectors of the extracted rotating component anomaly vector field, and finally selecting the typhoon center by calculating a maximum density normal vector intersection point based on a Gaussian kernel density estimation technique. Accordingly, it is possible to detect the moving path of the typhoon rapidly and objectively.

11 Claims, 13 Drawing Sheets

(56) References Cited

FOREIGN PATENT DOCUMENTS

| | | | |
|---|---|---|---|
| JP | 3377079 | B2 * | 2/2003 |
| JP | 2005/106744 | A | 4/2005 |
| JP | 2008/051541 | A | 3/2008 |
| KR | 10-1280562 | B1 | 7/2013 |
| KR | 10-2015-0022510 | A | 3/2015 |
| KR | 10-1627714 | B1 | 6/2016 |
| WO | 2016/057859 | A1 | 4/2016 |

* cited by examiner

METHOD FOR TYPHOON CENTER AUTOMATIC SELECTION USING VECTORS CALCULATED FROM RADAR IMAGE DATA BY OPTICAL FLOW TECHNIQUE, RECORDING MEDIUM AND DEVICE FOR PERFORMING THE METHOD

CROSS-REFERENCE TO RELATED APPLICATIONS

This application claims priority under 35 U.S.C. § 119 to Korean Patent Application No. 10-2020-0115182, filed on Sep. 9, 2020, in the Korean Intellectual Property Office, the disclosure of which is incorporated herein by reference in its entirety.

TECHNICAL FIELD

The present disclosure relates to a method for automatic selection of typhoon center using vectors calculated from radar image data by an optical flow technique, a recording medium and a device for performing the same, and more particularly, to technology that detects the location of the typhoon center rapidly and objectively based on visual (optical) analysis of radar images by direct use of high temporal and spatial resolution radar image data.

BACKGROUND ART

Weather radar is an instrument that radiates electromagnetic waves in the air and observes the locations and intensities of precipitation targets within the observation radius through the strength and the reception time of an electromagnetic signal reflected back by rain, snow, hail, etc.

In general, radars used in weather forecast are S band large-scale radars having the wavelength of about 10 cm and have the observation range of about 200 km in radius. The weather radars operate as a network of radars in the form of an observation network, and in the case of Republic of Korea, this signifies that meteorological phenomena in a wide range of areas including the seas can be observed.

In particular, weather radar data has much higher temporal and spatial resolution than other weather observation data (in the case of Republic of Korea, observation at 5 minute intervals over all the areas of the Korean Peninsula including the territorial waters) to effectively detect various scales of meteorological phenomena. Additionally, weather radar images generated every five minutes make it easy to detect the flow of meteorological phenomena quickly, thereby tracking the motion of meteorological phenomena over time.

The selection of typhoon center in radar images is performed by determining an intersection point of zero radial velocity lines of adjacent radars and the center of rotation of radar reflectivity in a spiral shape with analyzers' eyes. However, there is a subjective difference in data interpretation between the analyzers and it takes a predetermined amount of time to interpret each radar image.

DISCLOSURE

Technical Problem

In view of this circumstance, the present disclosure is directed to providing a method for automatic selection of typhoon center using vectors calculated from radar image data by an optical flow technique.

The present disclosure is further directed to providing a recording medium having recorded thereon a computer program for performing the method for automatic selection of typhoon center using vectors calculated from radar image data by an optical flow technique.

The present disclosure is further directed to providing a device for performing the method for automatic selection of typhoon center using vectors calculated from radar image data by an optical flow technique.

Technical Solution

A method for automatic selection of typhoon center using vectors calculated from radar image data by an optical flow technique according to an embodiment for achieving the above-described object of the present disclosure includes calculating a valid vector field from the radar image data using the optical flow technique, generating a dense vector field by interpolating an empty spot of the valid vector field using linear interpolation, extracting an anomaly vector field including typhoon rotating component anomaly vectors by removing a relative vector in the interpolated valid vector field, generating a normal vector intersection point of the vectors of the extracted rotating component anomaly vector field, and finally selecting the typhoon center by calculating a maximum density normal vector intersection point based on a Gaussian kernel density estimation technique.

In an embodiment of the present disclosure, calculating the valid vector field may include selecting two images at consecutive times from the radar image data, generating sparse vectors having a predetermined spacing using the optical flow technique through a difference between the two images, removing error vectors from the generated vectors, and generating the valid vector field through an average with a vector field of a nearest hour to the corresponding time.

In an embodiment of the present disclosure, calculating the valid vector field may further include selecting reference coordinates from the radar image data, and defining an extraction area with respect to the reference coordinates.

In an embodiment of the present disclosure, generating the dense vector field may include primarily interpolating the empty spot of the valid vector field using a neighboring vector, secondarily interpolating a far empty spot of the primarily interpolated valid vector field through vector resolution upscaling, and generating the dense vector field formed with a preset grid spacing over an entire analyzed field area.

In an embodiment of the present disclosure, the primary interpolation may include linear interpolation, and the secondary interpolation may include Radial Basis Function (RBF) interpolation.

In an embodiment of the present disclosure, extracting the rotating component anomaly vector field may include calculating the sum of u, v components of all the vectors, calculating the relative vector as an average of all vectors of an analyzed field by dividing the calculated sum of u, v components by the number of vectors, and generating the typhoon rotating component anomaly vectors by removing the relative vector from the dense vector field.

In an embodiment of the present disclosure, generating the normal vector intersection point of the vectors of the extracted rotating component anomaly vector field may include determining a normal vector extension weight of the extracted rotating component anomaly vectors, calculating a normal vector of each vector of the rotating component anomaly vector field, extending each normal vector by applying the normal vector extension weight to the rotating component anomaly vector field, excluding a potential erroneous intersection point generating vector, and generating the normal vector intersection point of the rotating component anomaly vectors excluding the potential erroneous intersection point generating vector.

In an embodiment of the present disclosure, determining the normal vector extension weight may include determining based on at least one of a resolution, a vector field resolution, a computing system cost or a computation time.

In an embodiment of the present disclosure, the potential erroneous intersection point generating vector may include at least one of a parallel vector, an equal vector, an opposite vector or a divergent vector.

A computer-readable storage medium according to an embodiment for achieving another object of the present disclosure has recorded thereon a computer program for performing the method for automatic selection of typhoon center using vectors calculated from radar image data by an optical flow technique.

A device for automatic selection of typhoon center using vectors calculated from radar image data by an optical flow technique according to an embodiment for achieving still another object of the present disclosure includes a valid vector field calculation unit to calculate a valid vector field from the radar image data using the optical flow technique, a vector interpolation unit to generate a dense vector field by interpolating an empty spot of the valid vector field using linear interpolation, a rotating component anomaly extraction unit to extract a rotating component anomaly vector field including typhoon rotating component vectors by removing a relative vector in the interpolated valid vector field, an intersection point generation unit to generate a normal vector intersection point of the vectors of the extracted rotating component anomaly vector field, and a typhoon center selection unit to finally select the typhoon center by calculating a maximum density normal vector intersection point based on a Gaussian kernel density estimation technique.

Advantageous Effects

According to the method for automatic selection of typhoon center using vectors calculated from radar image data by an optical flow technique, it is possible to automatically track the typhoon center using high temporal and spatial resolution radar data as opposed to low resolution ground observation data. In particular, it is possible to acquire quasi real time typhoon center information by immediate analysis of radar image data, thereby detecting the moving path of the typhoon rapidly and accurately. In particular, it is possible to provide objective information by minimizing errors caused by analyzers' subjective interpretation through consistent information provision via automatic tracking.

BEST MODE

Figure 1:
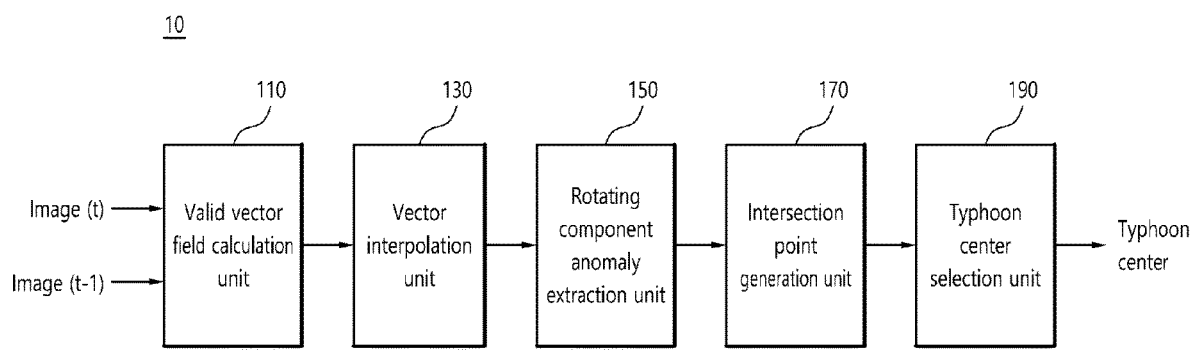
FIG. 1 is a block diagram of a device for automatic selection of typhoon center using vectors calculated from radar image data by an optical flow technique according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, the preferred embodiments of the present disclosure will be described in more detail with reference to the accompanying drawings.

FIG. 1 is a block diagram of a device for automatic selection of typhoon center using vectors calculated from radar image data by an optical flow technique according to an embodiment of the present disclosure.

The device 10 for automatic selection of typhoon center using vectors calculated from radar image data by an optical flow technique (hereinafter the device) according to the present disclosure calculates motion vectors by detecting instantaneous changes of radar echoes in radar image data before and after the corresponding time using a visual analysis algorithm known as an optical flow technique.

Additionally, the device 10 automatically selects the typhoon center through a process of calculating imaginary vectors in empty spots, and distinguishing between rotating components of the typhoon itself and motion vectors of all precipitation echoes (relative vector removal). The high temporal resolution (quasi real time) typhoon center information calculated according to the present disclosure may be used as industrial support technology for typhoon path prediction.

Referring to FIG. 1, the device 10 according to the present disclosure includes a valid vector field calculation unit 110, a vector interpolation unit 130, a rotating component anomaly extraction unit 150, an intersection point generation unit 170 and a typhoon center selection unit 190.

The device 10 of the present disclosure may run software (application) for automatic selection of typhoon center using vectors calculated from radar image data by an optical flow technique, and the valid vector field calculation unit 110, the vector interpolation unit 130, the rotating component anomaly extraction unit 150, the intersection point generation unit 170 and the typhoon center selection unit 190 may be controlled by the software for automatic selection of typhoon center using vectors calculated from radar image data by an optical flow technique, running on the device 10.

The device 10 may be a separate terminal or modules of the terminal. Additionally, the valid vector field calculation unit 110, the vector interpolation unit 130, the rotating component anomaly extraction unit 150, the intersection point generation unit 170 and the typhoon center selection unit 190 may be formed as an integrated module or at least one module. However, to the contrary, each element may be formed as a separate module.

The device 10 may be mobile or fixed. The device 10 may be in the form of a server or an engine, and may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The valid vector field calculation unit 110 calculates a valid vector field from the radar image data using the optical flow technique.

The present disclosure analyzes high resolution weather radar image data by the optical flow technique to eliminate subjectivity resulting from weather radar data analyzers' analysis with eyes and acquire meteorological phenomena motion track information in quasi real time.

To this end, the valid vector field calculation unit 110 selects a radar image (Image (t)) at a target time and an image (Image (t−1)) at an immediately previous time, and in this instance, a shorter time interval between the two images is more desirable. The valid vector field is generated through a difference between the two images, and the vector resolution is scaled up to ease the empty spot interpolation and analysis. When the uniform vector field with high resolution is completed, a typhoon rotating component anomaly is extracted and the typhoon center is finally selected through generation of normal vector intersection point of anomaly vectors and calculation of maximum density intersection point.

Since the optical flow algorithm used in the present disclosure is not developed for weather radar image data processing, in some instances, meteorologically insignificant values may be produced in the vector generation. For example, one of u and v components of a vector may be zero. There may be a flow of air having only the u or v component, but such a case is extremely rare in the meteorological aspect and may be recognized as an error value in the implementation of the present disclosure.

To eliminate this error, in the vector generation by the optical flow technique, sparse vectors of a predetermined spacing are generated (for example, in the dense vector generation, it is a high possibility that only one of u and v values is generated, and the predetermined spacing is selected as 40 km×40 km through analysis of various typhoon cases), and when only one of u and v values exists, the value is removed and a valid vector of hour intended to calculate is calculated through an average with a vector field of nearest hour to the corresponding time.

When calculating the valid vector, a user may select and define an analysis area considering the performance of the computing system, and reference coordinates is set through primary optical flow analysis over the entire area of the radar images and an optimal range compared to the system performance is set. The present disclosure defines an area of 500 km×500 km by extracting the 250 km range around the reference coordinates.

The vector interpolation unit 130 generates a dense vector field by interpolating empty spots of the valid vector field using linear interpolation.

The generated valid vector only exists in an area in which there is a radar reflectivity image, and thus information is insufficient for determining the total flow of air and the center of a rotating zone in the flow to find the center of the typhoon. In particular, in the case of a high distribution ratio of empty spot in which the valid vector is not calculated due to the absence of radar reflectivity, intersection points of vectors for finding the typhoon center are insufficient, resulting in low accuracy of typhoon center selection. To minimize this problem, the empty spots of adjacent area having radar reflectivity are linearly interpolated using neighboring vector data.

The typhoon center exists at the maximum intersection point of normal vector extension lines of rotation, and in this instance, for sufficient intersection points, it is necessary to upscale the vector resolution and interpolate far empty spots other than the area having radar reflectivity. To this end, the dense vector field is calculated over the entire area of the analyzed field by increasing the resolution (40 km→20 km) and interpolating the empty spots using Radial Basis Function (RBF).

Figure 2:
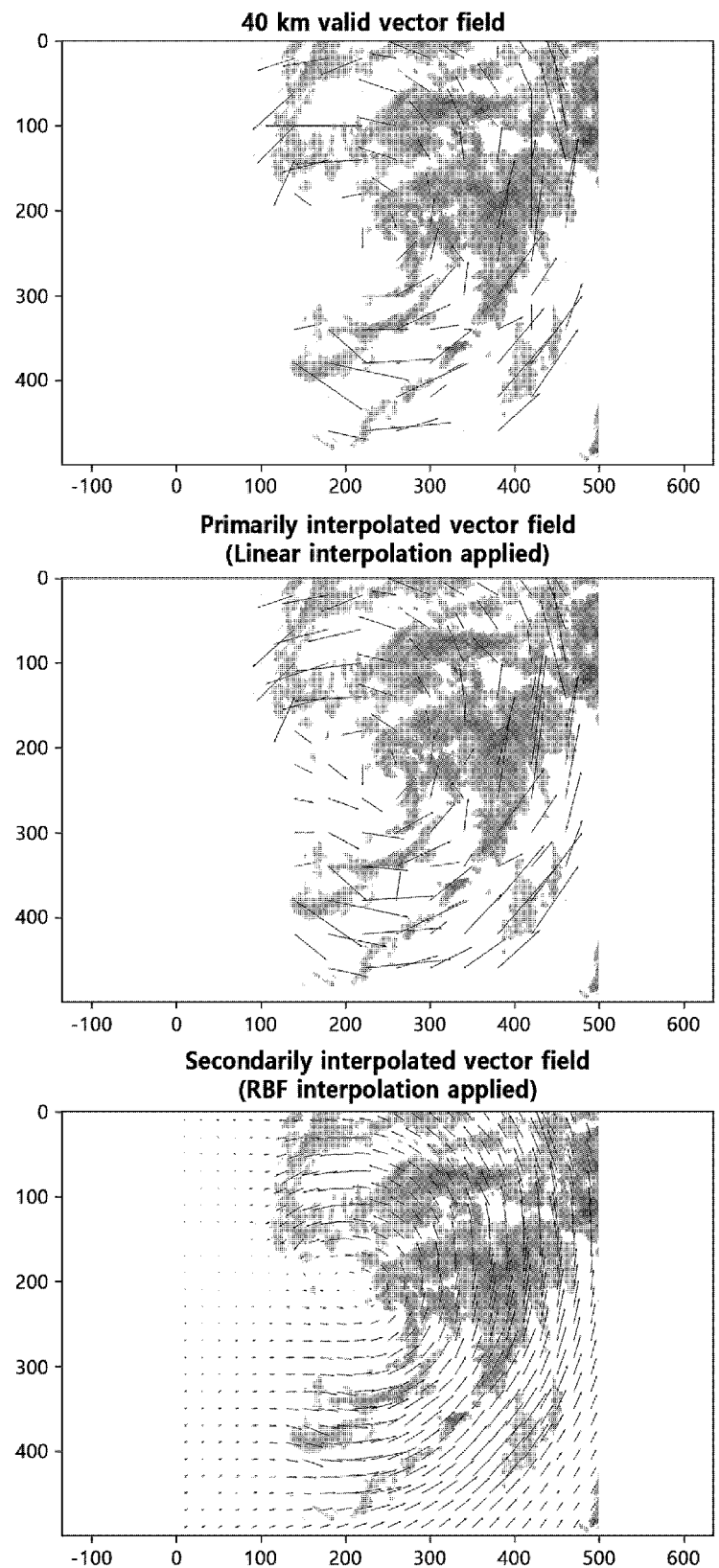
FIG. 2 is a diagram showing the result of empty spot interpolation and vector resolution upscaling based on radar images of the 2019 fifth typhoon Danas.

FIG. 2 shows the process of empty spot interpolation and vector resolution upscaling for radar image data of the 2019 fifth typhoon Danas.

The rotating component anomaly extraction unit 150 extracts an anomaly vector field including typhoon rotating component anomaly vectors by removing a relative vector in the interpolated valid vector field.

The center of the typhoon is morphologically the center of strong rotation. From the meteorological perspective, it is necessary to select the exact center through actually measured data of atmospheric pressure and wind, but the present disclosure is aimed at automatic selection of typhoon center using consecutive radar image data itself. To this end, it is necessary to increase the accuracy of normal vector extension intersection of the rotating component vectors by extracting rotating component anomalies from the analyzed field calculated through interpolation and resolution scaling.

To extract the typhoon rotating component anomaly, it is necessary to separate the vector flow of the entire analyzed field and the vector flow of the typhoon itself, and the relative vector indicating the flow of the entire analyzed field may be obtained as an average of all the vectors of the analyzed field by dividing the sum of u and v components of all the vectors by the number of vectors.

Figure 3:
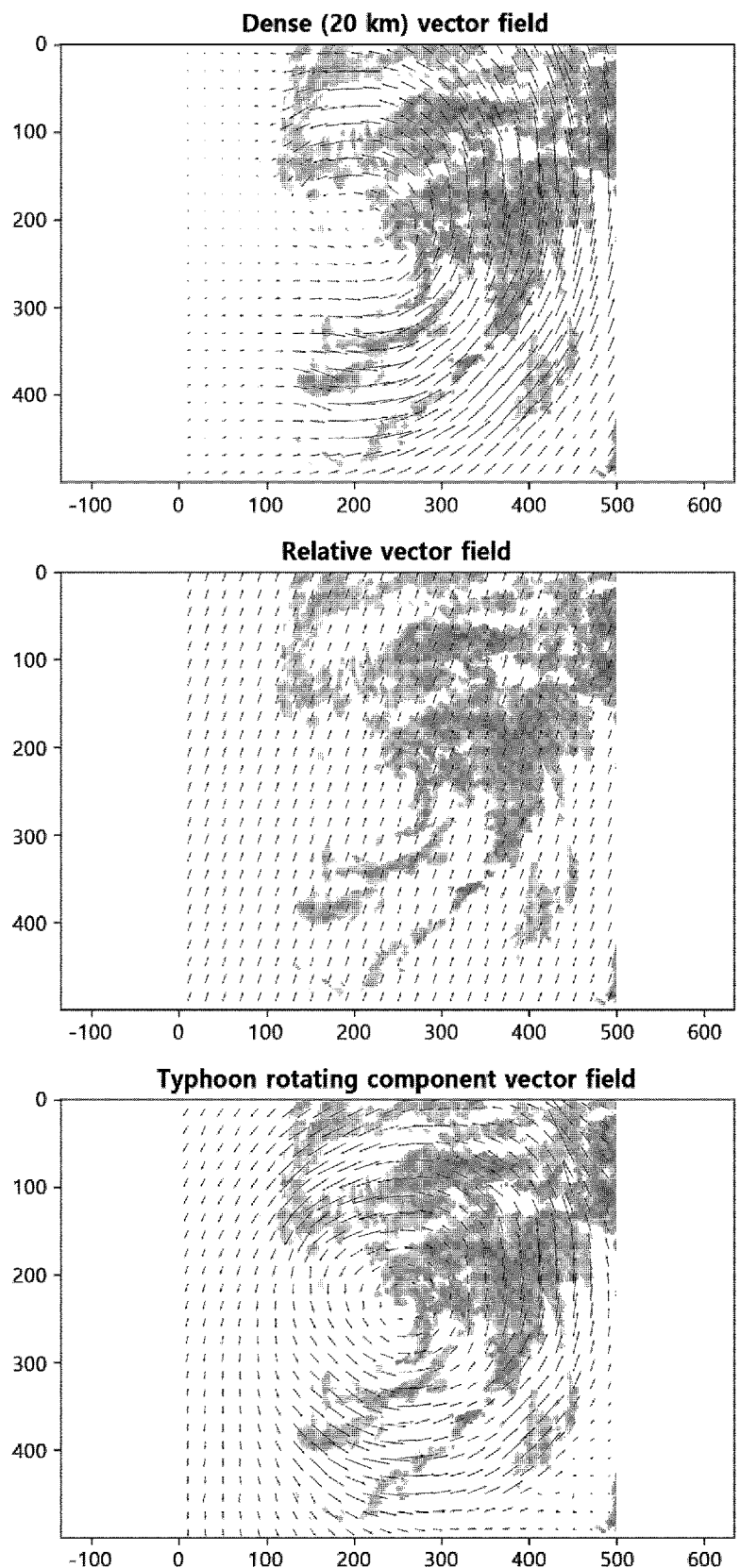
FIG. 3 is a diagram showing the result of typhoon rotating component anomaly calculation based on radar images of the 2019 fifth typhoon Danas.

The typhoon rotating component anomaly is calculated by removing the calculated relative vector value from the existing vector value, and accordingly the rotating component of the typhoon is represented more clearly. FIG. 3 shows the result of extracting the rotating component anomalies in the 2019 fifth typhoon Danas case.

The intersection point generation unit 170 generates a normal vector intersection point of the anomaly vectors of the extracted rotating component anomaly vector field.

To find the center of rotation in the rotating component anomaly vector field from which only the rotating components of the typhoon are extracted, the principle of centripetal force is considered. The centripetal force acts towards the center of a circle in a circular motion (rotation), and is perpendicular to the actual motion direction.

Figure 4:
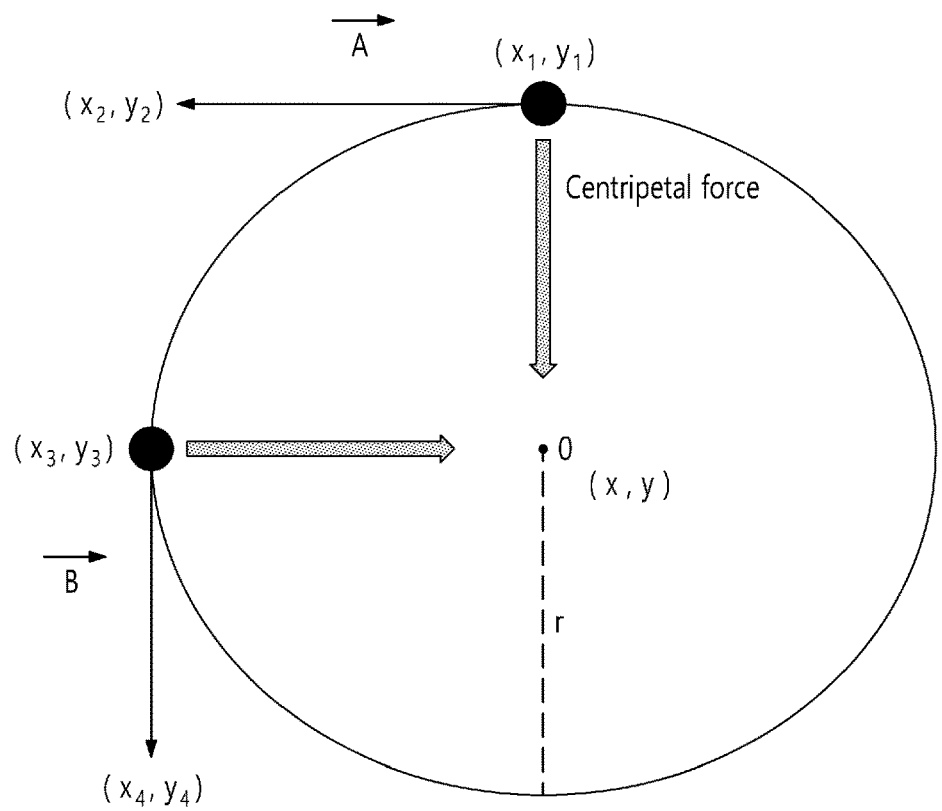
FIG. 4 is a diagram for describing normal vectors of vectors A and B in a circular motion (a rotational motion) and their intersection point.

That is, an intersection point of imaginary lines (normal lines) perpendicular to the rotating component vectors (in the present disclosure, since the counterclockwise rotation of the typhoon is considered, 90° in the counterclockwise direction of the vector is considered) may be the center of the typhoon. The arrow in FIG. 4 indicates the normal vectors of vectors A and B in the circular motion, and in this instance, the intersection point O (x, y) of the two vectors is shown in the following Equation 1.

$$x = \frac{(x_2 y_1 - x_1 y_2)(x_4 - x_3) - (x_4 y_3 - x_3 y_4)(x_2 - x_1)}{(x_2 - x_1)(y_4 - y_3) - (x_4 - x_3)(y_2 - y_1)}$$
$$y = \frac{(x_2 y_1 - x_1 y_2)(y_4 - y_3) + (x_4 y_3 + x_3 y_4)(y_2 - y_1)}{(x_2 - x_1)(y_4 - y_3) - (x_4 - x_3)(y_2 - y_1)}$$
[Equation 1]

To find the intersection point of the normal lines of the vectors, it is necessary to create an opportunity for intersection through extension of the normal lines, and to this end, an extension weight is applied to the normal vectors. In this instance, for example, a valid area (300 km×300 km) may be selected, considering areas where the typhoon center can physically move over time based on the reference coordinates. It is to prevent inefficiency in the calculation of the intersection points of vectors over the entire area and errors that may occur at the edge of the analysis area.

In case that the resolution of the vector field being analyzed is very high resolution, the weight is very low or may not be applied. The spatial resolution of the typhoon rotating component anomaly vector field is 20 km, and for effective intersection point selection, as a result of discovering an optimal weight considering computing system cost and computation time together, the weight 30 is the most optimal.

Figure 5:
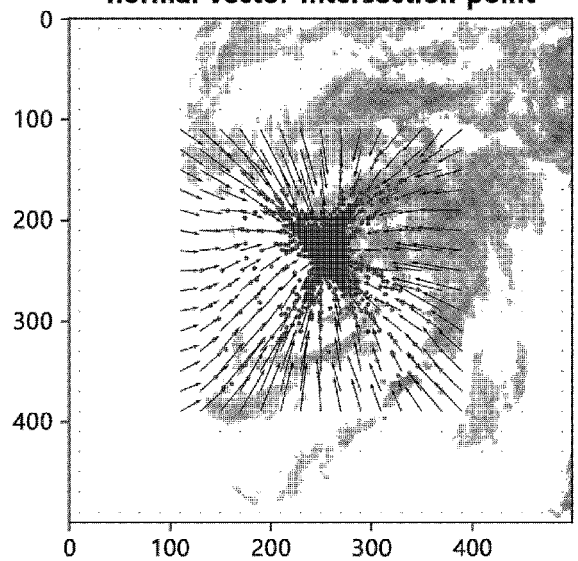
FIG. 5 is a diagram showing the result of normal vector intersection point generation in a typhoon rotating component anomaly vector field based on radar images of the 2019 fifth typhoon Danas.

The intersection point of normal lines of vectors except erroneous intersection points, for example, parallel vectors, equal vectors, opposite vectors and divergent vectors, are generated. FIG. 5 shows an example of generating the intersection points of normal vectors after calculating the rotating component anomaly vector field of the 2019 fifth typhoon Danas.

The typhoon center selection unit 190 finally selects the typhoon center by calculating a maximum density normal vector intersection point based on the Gaussian kernel density estimation technique.

Among the intersection points of normal vectors generated in the typhoon rotating component anomaly vector field, the maximum density point is selected as the center of the typhoon. The method used in the present disclosure for maximum density point selection is the Gaussian kernel density estimation technique that overcomes the discontinuity in data element distribution (bin) of the 2D histogram technique which is the simplest way to predict the density.

In the case of Kernel density prediction, the kernel function of the following Equation 2 is calculated with respect to each data element distribution, and all is summed up and divided by the total number of data, thereby obtaining continuity in data element distribution (bin) and a soft probability density function.

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right)$$ [Equation 2]

In this instance, it is necessary to set the optimal data element distribution (bin) and band width for efficient calculation and derivation of an optimal function for analysis data resolution. The present disclosure sets the size of the element distribution (bin) to 100 and the band width to 1.

Figure 6A:
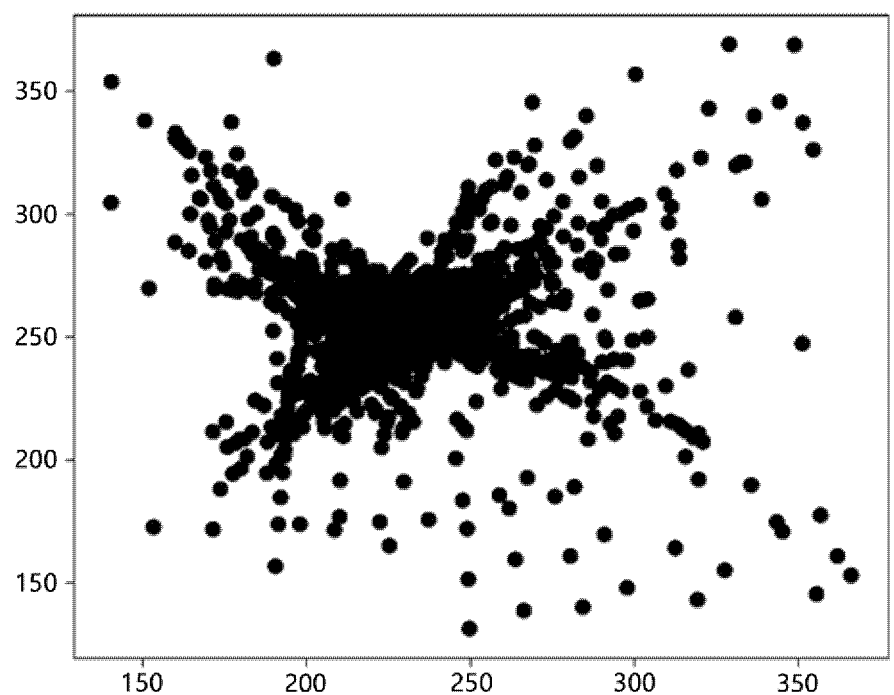
FIGS. 6A-6C are diagrams showing (A) a normal vector intersection point distribution, (B) a density distribution through 2D histogram, and (C) a density distribution through kernel density estimation.
Figure 6B:
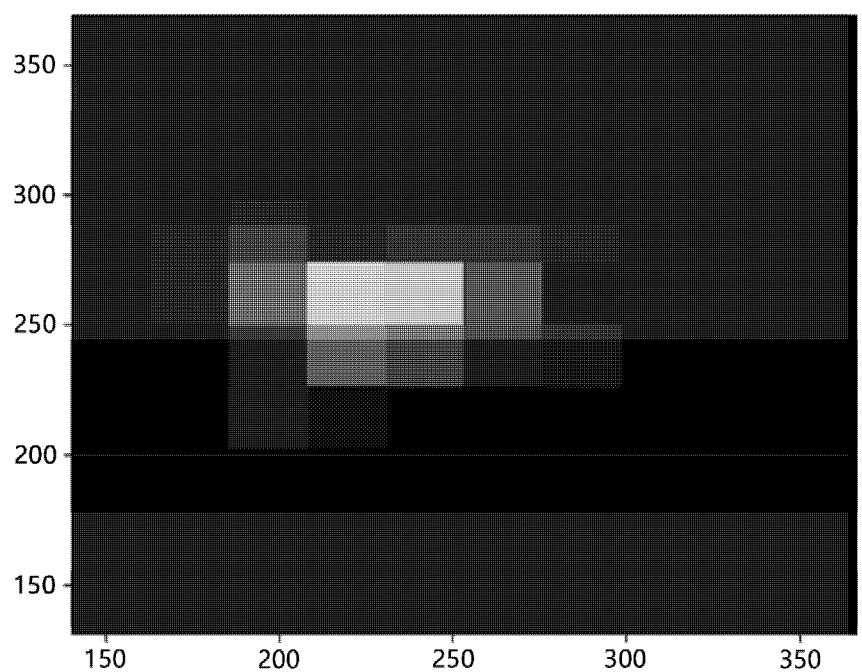
Figure 6C:
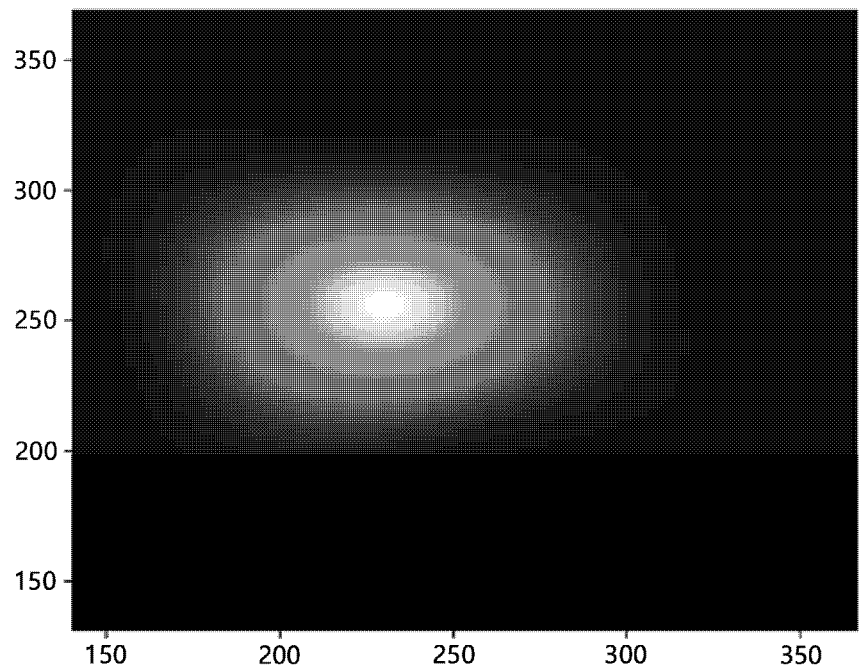

FIGS. 6A-6C show the analysis data of the intersection points of normal vectors calculated in the previous process using the 2D histogram and the kernel density function, and as can be seen in the drawing, analysis through the kernel density function is efficient in the typhoon center selection.

Figure 7:
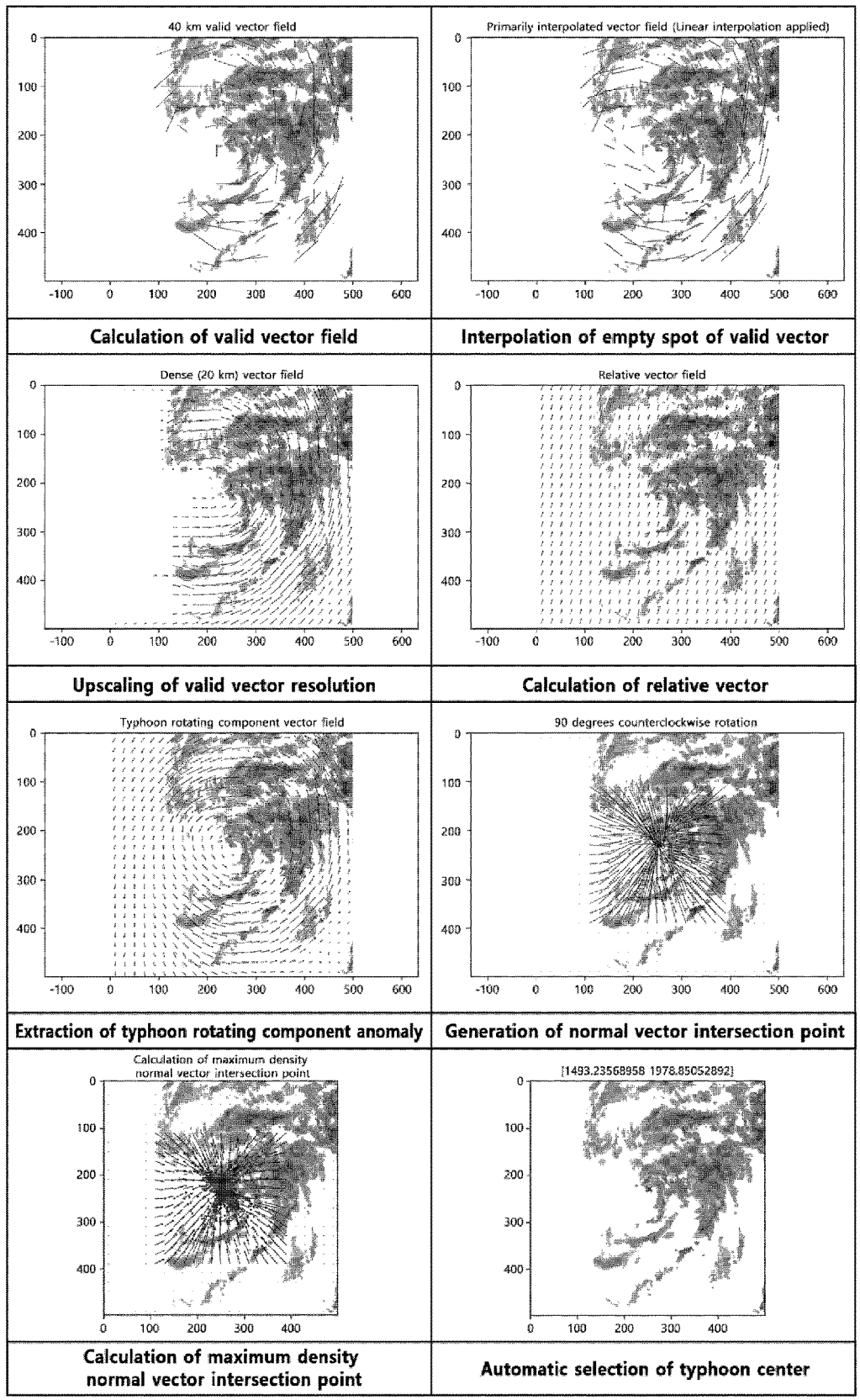
FIG. 7 is a diagram showing a process of automatic selection of typhoon center through an optical flow technique based on radar images of the 2019 fifth typhoon Danas.

FIG. 7 shows information calculated in each step of the process of automatic selection of typhoon center using radar image data of the 2019 fifth typhoon Danas by the optical flow technique.

Figure 8:
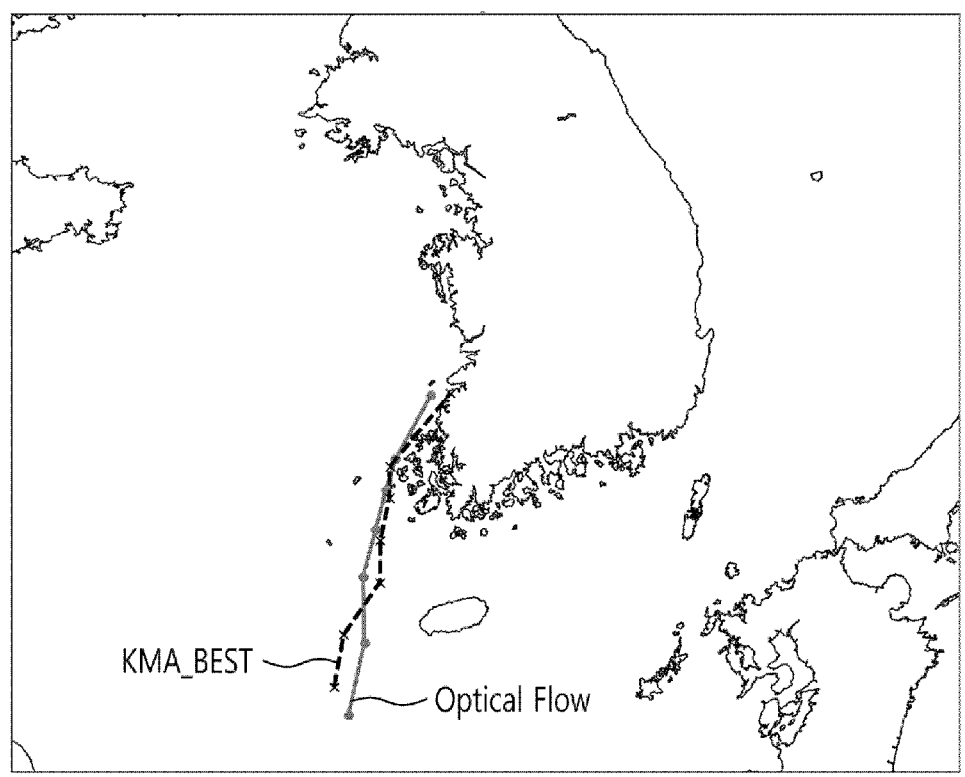
FIG. 8 is a diagram showing the comparison between a moving path of typhoon center through an optical flow technique based on radar images of the 2019 fifth typhoon Danas and a moving path selected by the meteorological administration.

Finally, the moving path of the center of the typhoon Danas derived through the present disclosure is shown in FIG. 8. In FIG. 8, the solid line indicates the moving path of the typhoon center selected by the present disclosure, and the dashed line indicates the moving path of the typhoon center finally determined by the meteorological administration using a combination of satellite data and ground data. The following Table 1 shows the comparison of location information of the two paths.

efficient use of high temporal and spatial resolution radar image data and the optical flow technique. The present disclosure ensures objectivity and provides data rapidly by automating the typhoon center analysis based on radar images including subjectivity of analyzers.

Additionally, the present disclosure involving the direct use of radar image data through detection of instantaneous changes of echoes in radar images, motion vector calculation, empty spot interpolation and typhoon rotating component anomaly extraction provides quasi real time typhoon center analysis information, and thus is very useful in the weather forecast and special report tasks requiring quick hazardous weather information.

Figure 9:
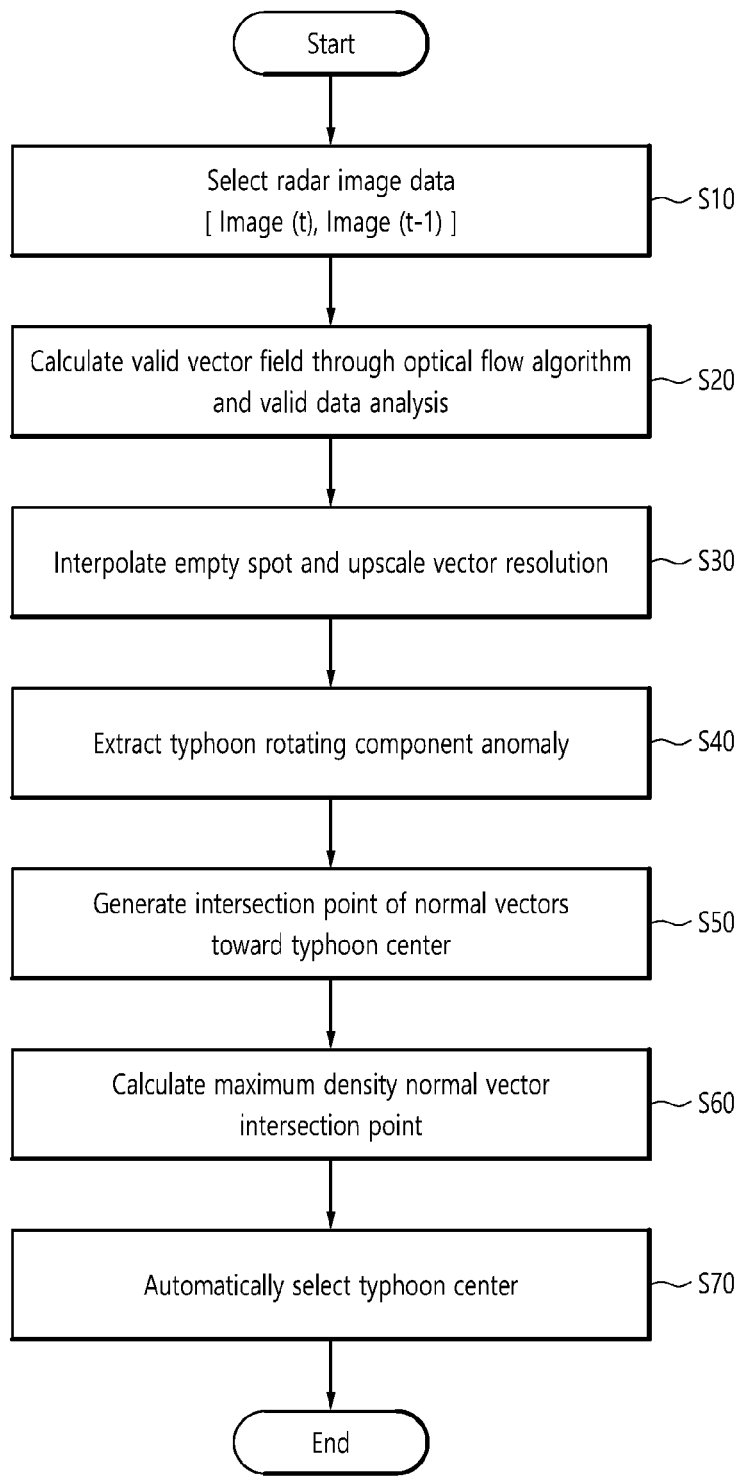
FIG. 9 is a flowchart of a method for automatic selection of typhoon center using vectors calculated from radar image data by an optical flow technique according to an embodiment of the present disclosure.

FIG. 9 is a flowchart of a method for automatic selection of typhoon center using vectors calculated from radar image data by an optical flow technique according to an embodiment of the present disclosure.

The method for automatic selection of typhoon center using vectors calculated from radar image data by an optical flow technique according to this embodiment may be performed in substantially the same configuration as the device 10 of FIG. 1. Accordingly, the same element as the device 10 of FIG. 1 is given the same reference sign, and a repetitive description is omitted herein.

Additionally, the method for automatic selection of typhoon center using vectors calculated from radar image data by an optical flow technique according to this embodiment may be performed by the software (application) for automatic selection of typhoon center using vectors calculated from radar image data by an optical flow technique.

Referring to FIG. 9, the method for automatic selection of typhoon center using vectors calculated from radar image data by an optical flow technique according to this embodiment includes calculating a valid vector field from the radar image data (S10) using the optical flow technique (S20).

Figure 10:
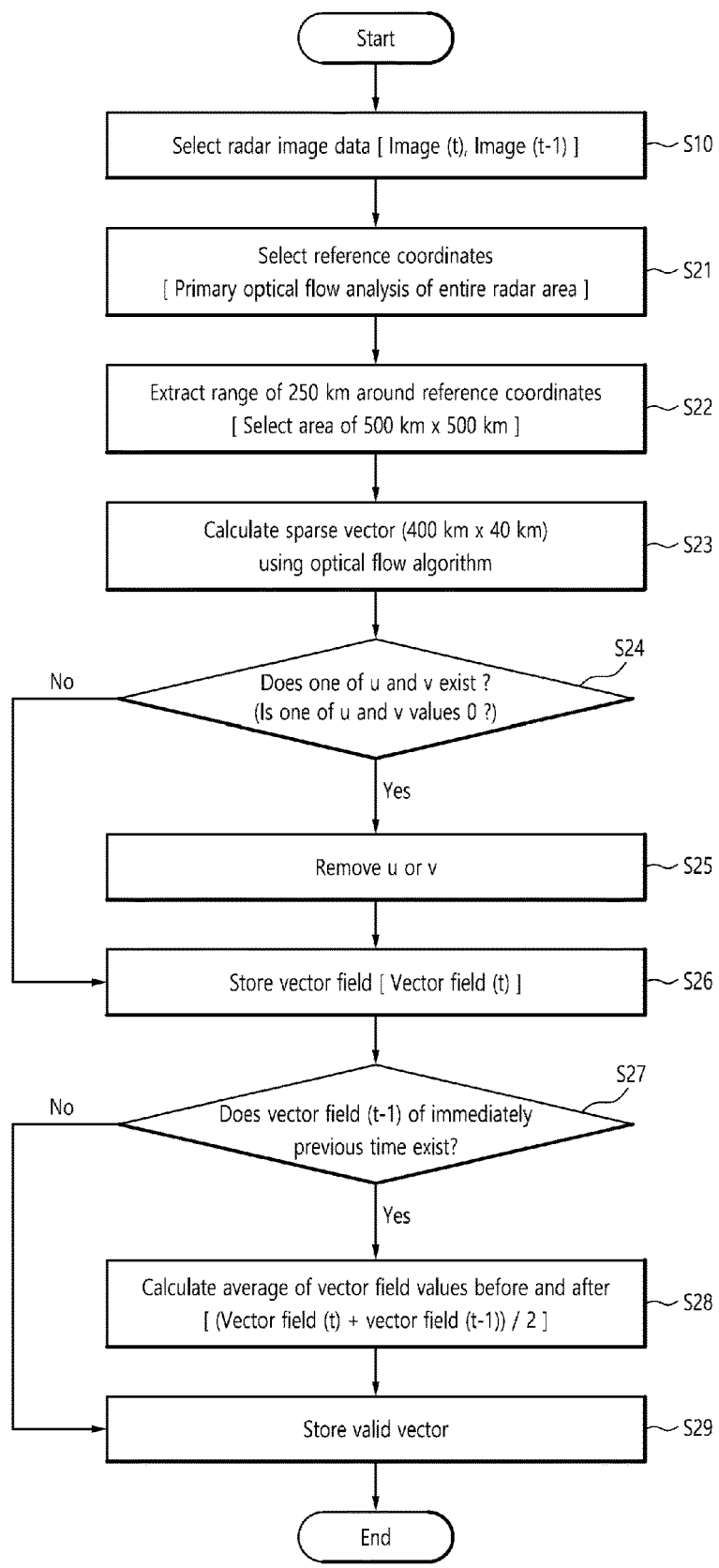
FIG. 10 is a detailed flowchart of a process of calculating a valid vector based on radar images in FIG. 9.

Referring to FIG. 10, in the step of calculating the valid vector field, two images at consecutive times (Image (t), Image (t−1)) are selected from the radar image data (S10).

First, reference coordinates may be selected by analyzing a primary optical flow of the entire area from the radar image data (S21), and an extraction area may be defined with respect to the reference coordinates (S22). For example, the entire area of 500 km×500 km may be selected by extracting the 250 km range around the reference coordinates.

Sparse vectors having a predetermined spacing are generated using the optical flow technique through a difference

TABLE 1

| | Meteorological administration (A) | | Optical flow technique (B) | | Meteorological administration − Optical flow technique (A − B) | | Error |
|---|---|---|---|---|---|---|---|
| Time | Longitude | Latitude | Longitude | Latitude | Longitude difference | Latitude difference | $\sqrt{(A^2)+(B^2)}$ |
| 00 | 125.2 | 32.7 | 125.37 | 32.43 | −0.17 | 0.27 | 0.2429 |
| 03 | 125.3 | 33.2 | 125.53 | 33.13 | −0.23 | 0.07 | 0.2349 |
| 06 | 125.7 | 33.7 | 125.51 | 33.75 | 0.19 | −0.05 | 0.1925 |
| 09 | 125.7 | 34.1 | 125.65 | 34.21 | 0.05 | −0.11 | 0.0621 |
| 12 | 125.8 | 34.5 | 125.76 | 34.57 | 0.04 | −0.07 | 0.0449 |
| 15 | 125.8 | 34.8 | 125.87 | 34.88 | −0.07 | −0.08 | 0.0764 |
| 21 | 126.5 | 35.5 | 126.27 | 35.48 | 0.23 | 0.02 | 0.2304 |

The present disclosure relates to development of technology for automatic selection of typhoon center through the between the two images (S23). For example, the sparse vectors may be generated every 40 km×40 km.

The generated vectors are analyzed to check if one of u, v components of a vector is zero (S24) to remove error vectors from the generated vectors (S25), and a vector field is stored (S26).

A valid vector field is generated (S29) through an average (S28) with a vector field of the nearest hour to the corresponding time (S27).

When the valid vector field is generated using the optical flow, a dense vector field is generated by interpolating empty spots of the valid vector field using linear interpolation (S30).

Figure 11:
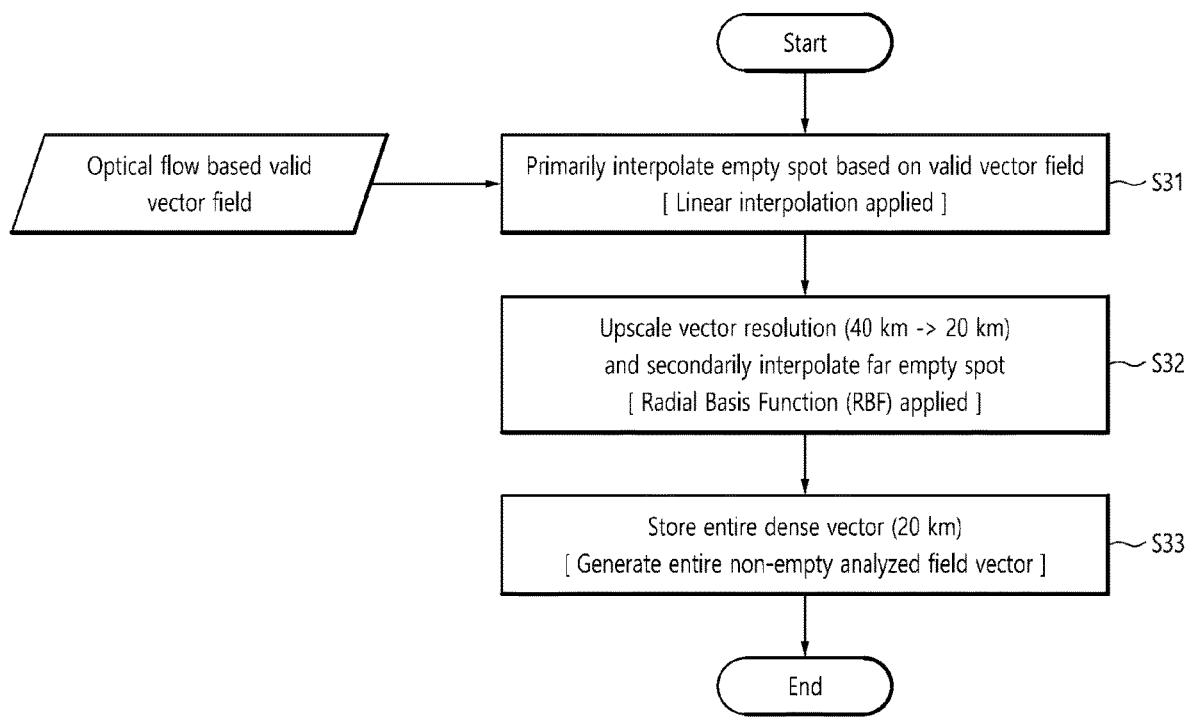
FIG. 11 is a detailed flowchart of a process of empty spot interpolation and vector resolution upscaling in FIG. 9.

Referring to FIG. 11, the step of generating the dense vector field includes primarily interpolating the empty spots of the valid vector field using neighboring vectors (S31). For example, the primary interpolation may include linear interpolation.

Secondary interpolation is performed on far empty spots of the primarily interpolated valid vector field through vector resolution upscaling (S32). For example, the secondary interpolation may include Radial Basis Function (RBF) interpolation.

The dense vector field formed with a preset grid spacing is generated over the entire area of the analyzed field (S33). For example, the dense spacing may be set to 20 km.

A rotating component anomaly vector field including typhoon rotating component anomaly vectors is extracted by removing a relative vector in the interpolated valid vector field (S40).

Figure 12:
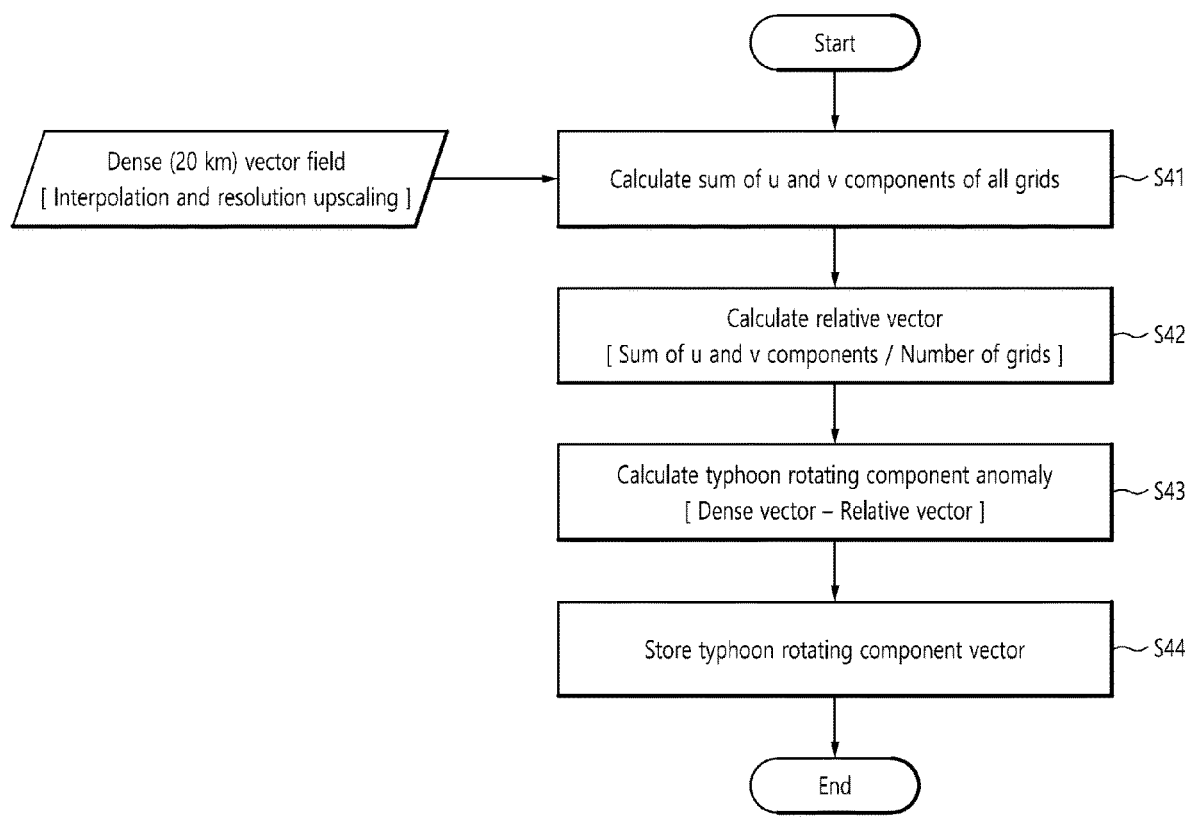
FIG. 12 is a detailed flowchart of a process of extracting a typhoon rotating component anomaly through relative vector removal in FIG. 9.

Referring to FIG. 12, in the step of extracting the rotating component anomaly vector field, the sum of u, v components of all the vectors is calculated (S41). The relative vector is calculated as an average of all the vectors of the analyzed field by dividing the calculated sum of u, v components by the number of vectors (S42).

The typhoon rotating component anomaly vectors are calculated by removing the relative vector from the dense vector field (S43), and the typhoon rotating component vectors are stored (S44).

A normal vector intersection point of the vectors of the extracted rotating component anomaly vector field is generated (S50).

Figure 13:
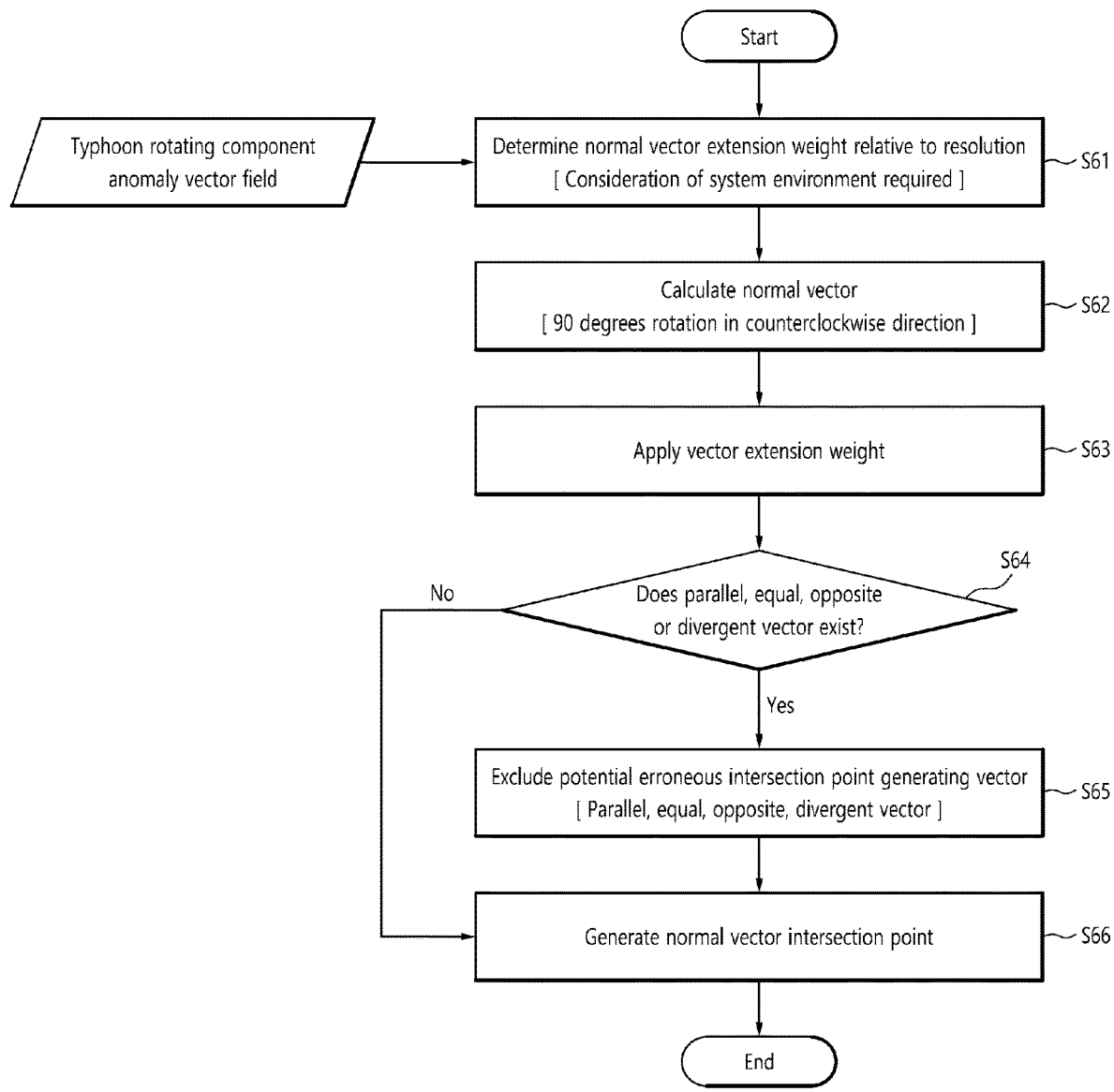
FIG. 13 is a detailed flowchart of a process of generating a normal vector tangent intersection point of vectors in a rotating component anomaly vector field of a typhoon of FIG. 9.

Referring to FIG. 13, in the step of generating the normal vector intersection point of the extracted rotating component anomaly vectors, a normal vector extension weight of the extracted rotating component anomaly vectors is determined (S61). The normal vector extension weight may be determined, considering the resolution, the vector field resolution, the computing system cost and the computation time.

A normal vector of each vector of the rotating component anomaly vector field is calculated (S62). For example, the normal vector may be calculated by 90 degrees counterclockwise rotation. Each normal vector is extended by applying the normal vector extension weight to the rotating component anomaly vector field (S63).

The absence or presence of a potential erroneous intersection point generating vector is detected (S64), and if the potential erroneous intersection point generating vector exists, the potential erroneous intersection point generating vector is excluded (S65). The potential erroneous intersection point generating vector may be parallel vectors, equal vectors, opposite vectors and divergent vectors.

The normal vector intersection point of the rotating component anomaly vectors excluding the potential erroneous intersection point generating vector is generated (S66).

A maximum density normal vector intersection point is calculated based on the Gaussian kernel density estimation technique (S60), and the typhoon center is finally selected (S70).

Among the intersection points of the normal vectors generated in the typhoon rotating component anomaly vector field, the maximum density point is selected as the center of the typhoon. The method used in the present disclosure for maximum density point selection is the Gaussian kernel density estimation technique that overcomes the discontinuity in data element distribution (bin) of the 2D histogram technique which is the simplest way to predict the density.

The present disclosure detects the location of the center of the typhoon rapidly by the analyzers' visual (optical) analysis of radar images directly using radar image data beyond the existing typhoon analysis through raw radar data, thereby minimizing analysis differences caused by subjectivity between the analyzers and increasing objectivity in radar image data interpretation.

The method for automatic selection of typhoon center using vectors calculated from radar image data by an optical flow technique according to an embodiment of the present disclosure may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

INDUSTRIAL APPLICABILITY

It is possible to track accurate moving paths of typhoons, and quick and accurate typhoon center information with high resolution as very important information to the meteorological administration, disaster prevention agency, sluice and aviation meteorology can be used as key information for predicting potential damage areas with the movements of typhoons. Accordingly, it is thought that the present disclosure will have high attention in the field of meteorological and disaster prevention service, sluice and aviation applications. In particular, it is expected that immediate meteorological phenomena change detection using radar image data will be advantageously used to develop a variety of weather related content in civil application.

DETAILED DESCRIPTION OF MAIN ELEMENTS

10: Device for automatic selection of typhoon center
110: Valid vector field calculation unit
130: Vector interpolation unit
150: Rotating component anomaly extraction unit
170: Intersection point generation unit
190: Typhoon center selection unit

The invention claimed is:

1. A method for automatic selection of a center of a typhoon, comprising:
    calculating a valid vector field from radar image data using an optical flow technique;
    generating a dense vector field by interpolating an empty spot of the valid vector field using linear interpolation;
    extracting an anomaly vector field including rotating component anomaly vectors of the typhoon by removing a relative vector in the interpolated valid vector field;
    generating a normal vector intersection point of the rotating component anomaly vectors of the extracted anomaly vector field; and
    finally selecting the center of the typhoon by calculating a maximum density normal vector intersection point based on a Gaussian kernel density estimation technique.

2. The method of claim 1, wherein the calculating the valid vector field comprises:
    selecting two images at consecutive times from the radar image data;
    generating sparse vectors having a predetermined spacing using the optical flow technique through a difference between the two images;
    removing error vectors from the generated sparse vectors; and
    generating the valid vector field through an average with a vector field of a time period nearest to a corresponding time.

3. The method of claim 2, wherein the calculating the valid vector field further comprises:
    selecting reference coordinates from the radar image data; and
    defining an extraction area with respect to the reference coordinates.

4. The method of claim 1, wherein the generating the dense vector field comprises:
    primarily interpolating the empty spot of the valid vector field using a neighboring vector;
    secondarily interpolating a far empty spot of the primarily interpolated valid vector field through vector resolution upscaling; and
    generating the dense vector field formed with a preset grid spacing.

5. The method of claim 4, wherein the primary interpolation uses linear interpolation, and the secondary interpolation uses Radial Basis Function (RBF) interpolation.

6. The method of claim 1, wherein the extracting the anomaly vector field comprises:
    calculating a sum of u, v components of all vectors;
    calculating the relative vector by dividing the calculated sum of u, v components by a number of vectors; and
    generating the rotating component anomaly vectors of the typhoon by removing the relative vector from the dense vector field.

7. The method of claim 1, wherein the generating the normal vector intersection point comprises:
    determining a normal vector extension weight of the rotating component anomaly vectors;
    calculating a normal vector of each vector of the anomaly vector field;
    extending each normal vector by applying the normal vector extension weight to the anomaly vector field;
    excluding a potential erroneous intersection point generating vector; and
    generating the normal vector intersection point of the rotating component anomaly vectors excluding the potential erroneous intersection point generating vector.

8. The method of claim 7, wherein the determining the normal vector extension weight comprises determining based on at least one of a resolution, a vector field resolution, a computing system cost, or a computation time.

9. The method of claim 7, wherein the potential erroneous intersection point generating vector includes at least one of a parallel vector, an equal vector, an opposite vector, or a divergent vector.

10. A non-transitory computer-readable storage medium having recorded thereon a computer program for performing a method for automatic selection of a center of a typhoon, wherein the method comprises:
    calculating a valid vector field from radar image data using an optical flow technique;
    generating a dense vector field by interpolating an empty spot of the valid vector field using linear interpolation;
    extracting an anomaly vector field including rotating component anomaly vectors of the typhoon by removing a relative vector in the interpolated valid vector field;
    generating a normal vector intersection point of the rotating component anomaly vectors of the extracted anomaly vector field; and
    finally selecting the center of the typhoon by calculating a maximum density normal vector intersection point based on a Gaussian kernel density estimation technique.

11. A device for automatic selection of a center of a typhoon, comprising:
    a valid vector field calculation unit calculating a valid vector field from radar image data using an optical flow technique;
    a vector interpolation unit generating a dense vector field by interpolating an empty spot of the valid vector field using linear interpolation;
    a rotating component anomaly extraction unit extracting an anomaly vector field including rotating component anomaly vectors of the typhoon by removing a relative vector in the interpolated valid vector field;
    an intersection point generation unit generating a normal vector intersection point of the rotating component anomaly vectors of the extracted anomaly vector field; and
    a typhoon center selection unit finally selecting the center of the typhoon by calculating a maximum density normal vector intersection point based on a Gaussian kernel density estimation technique.

* * * * *